(12) United States Patent
Fujio et al.

(10) Patent No.: US 9,950,828 B2
(45) Date of Patent: Apr. 24, 2018

(54) BAGGAGE CONVEYANCE TRAY

(71) Applicants: Yoshihiko Fujio, Shiga (JP); Takuya Isomura, Shiga (JP)

(72) Inventors: Yoshihiko Fujio, Shiga (JP); Takuya Isomura, Shiga (JP)

(73) Assignee: Daifuku Co., Ltd. (JP)

( * ) Notice: Subject to any disclaimer, the term of this patent is extended or adjusted under 35 U.S.C. 154(b) by 0 days.

(21) Appl. No.: 15/153,391

(22) Filed: May 12, 2016

(65) Prior Publication Data

US 2016/0264283 A1 Sep. 15, 2016

Related U.S. Application Data

(63) Continuation of application No. PCT/JP2014/077647, filed on Oct. 17, 2014.

(30) Foreign Application Priority Data

Nov. 14, 2013 (JP) ................................. 2013-235761

(51) Int. Cl.
*A47F 3/14* (2006.01)
*B65D 69/00* (2006.01)
(Continued)

(52) U.S. Cl.
CPC ................ *B65D 1/34* (2013.01); *B64F 1/368* (2013.01); *B65D 21/0212* (2013.01);
(Continued)

(58) Field of Classification Search
CPC .. B65D 1/34; B65D 21/0212; B65D 2203/10; B65D 81/3813; B64F 1/368;
(Continued)

(56) References Cited

U.S. PATENT DOCUMENTS 1,073,151 A * 9/1913 Matthew ................. F26B 25/18
105/375
3,433,184 A * 3/1969 Addy ................... B65D 19/004
108/53.3
(Continued)

FOREIGN PATENT DOCUMENTS

EP 1719721 A1 11/2006
JP S60101426 U 7/1985
(Continued)

*Primary Examiner* — Jennifer E. Novosad
(74) *Attorney, Agent, or Firm* — St. Onge Steward Johnston & Reens LLC

(57) ABSTRACT

A baggage conveyance tray suitable for a sorting conveyor system for conveying baggage at airports has raised wall plate portions protruding on the front and rear both end portions of the tray in the length (conveyance) direction thereof extending in the right-left width direction of the tray. A baggage placement surface located between the front and rear both raised wall plate portions is concave along the length direction such that the central portion in the right-left width direction is lowered while the right and left both sides are raised. Elongated protrusion portions extending along the right-left width direction of the tray are disposed on the baggage placement surface at intervals in the length direction of the tray.

7 Claims, 7 Drawing Sheets

(51) Int. Cl.
  *B65D 71/00* (2006.01)
  *B65D 19/00* (2006.01)
  *B65D 1/34* (2006.01)
  *B65D 21/02* (2006.01)
  *B64F 1/36* (2017.01)

(52) U.S. Cl.
  CPC .. *B65D 2203/10* (2013.01); *B65G 2201/0258* (2013.01); *B65G 2203/0216* (2013.01)

(58) Field of Classification Search
  CPC .... B65G 2203/2016; B65G 2201/0258; A47F 3/14; A47F 3/142; A47F 5/108
  USPC ............... 211/126.1, 133.1; 108/51.11, 52.1, 108/57.16, 57.18, 57.25, 57.29; 206/557; D34/29, 35
  See application file for complete search history.

(56) References Cited

U.S. PATENT DOCUMENTS

| | | | | |
|---|---|---|---|---|
| 3,927,769 | A * | 12/1975 | Maslow | F26B 25/18 108/156 |
| 4,533,585 | A * | 8/1985 | Holden | B65D 1/34 220/DIG. 6 |
| 4,635,563 | A * | 1/1987 | Hand | A47B 57/265 108/107 |
| 4,843,975 | A * | 7/1989 | Welsch | A47B 87/0223 108/192 |
| 6,471,039 | B1 | 10/2002 | Bruun et al. | |
| 6,807,911 | B2 * | 10/2004 | Carson | B65D 19/0016 108/57.28 |
| 7,766,174 | B2 * | 8/2010 | Abraitis | A47B 61/04 211/36 |
| 7,963,731 | B2 * | 6/2011 | Baker | B65D 57/00 410/155 |
| 7,987,798 | B2 * | 8/2011 | Kim | B65D 19/0095 108/51.11 |
| 8,407,957 | B2 * | 4/2013 | McClure | E04F 13/081 52/404.1 |
| D755,464 | S * | 5/2016 | Fujio | D34/29 |
| 2004/0251224 | A1 * | 12/2004 | Kircher | A47B 47/02 211/153 |
| 2008/0202391 | A1 * | 8/2008 | Pisano | B65D 19/0044 108/57.25 |
| 2011/0061995 | A1 * | 3/2011 | Huff | B65G 47/52 |
| 2016/0264283 | A1 * | 9/2016 | Fujio | B65D 21/0212 |

FOREIGN PATENT DOCUMENTS

| | | |
|---|---|---|
| JP | 2001096557 A | 4/2001 |
| JP | 2003011945 A | 1/2003 |
| JP | 2013154910 A | 8/2013 |

* cited by examiner

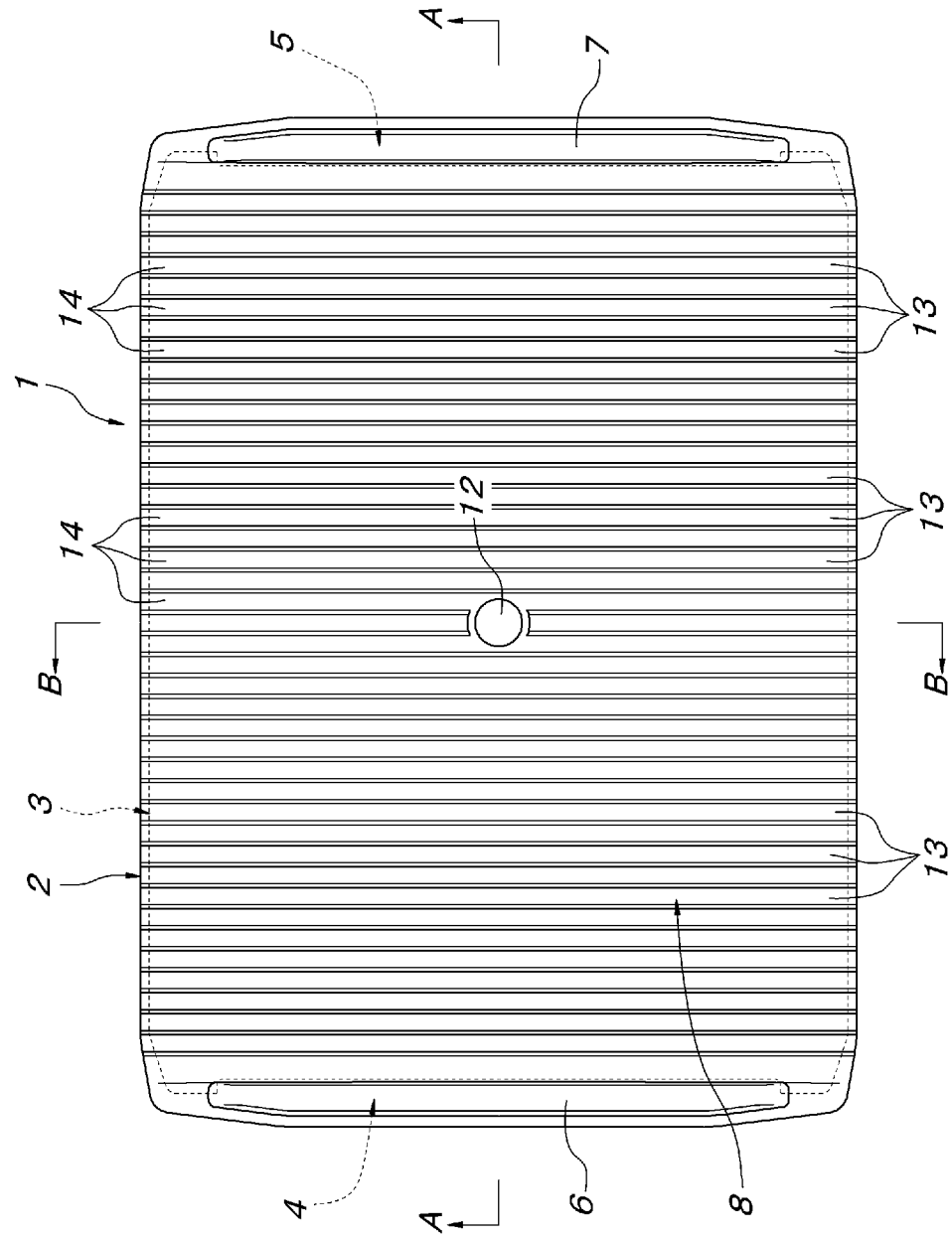

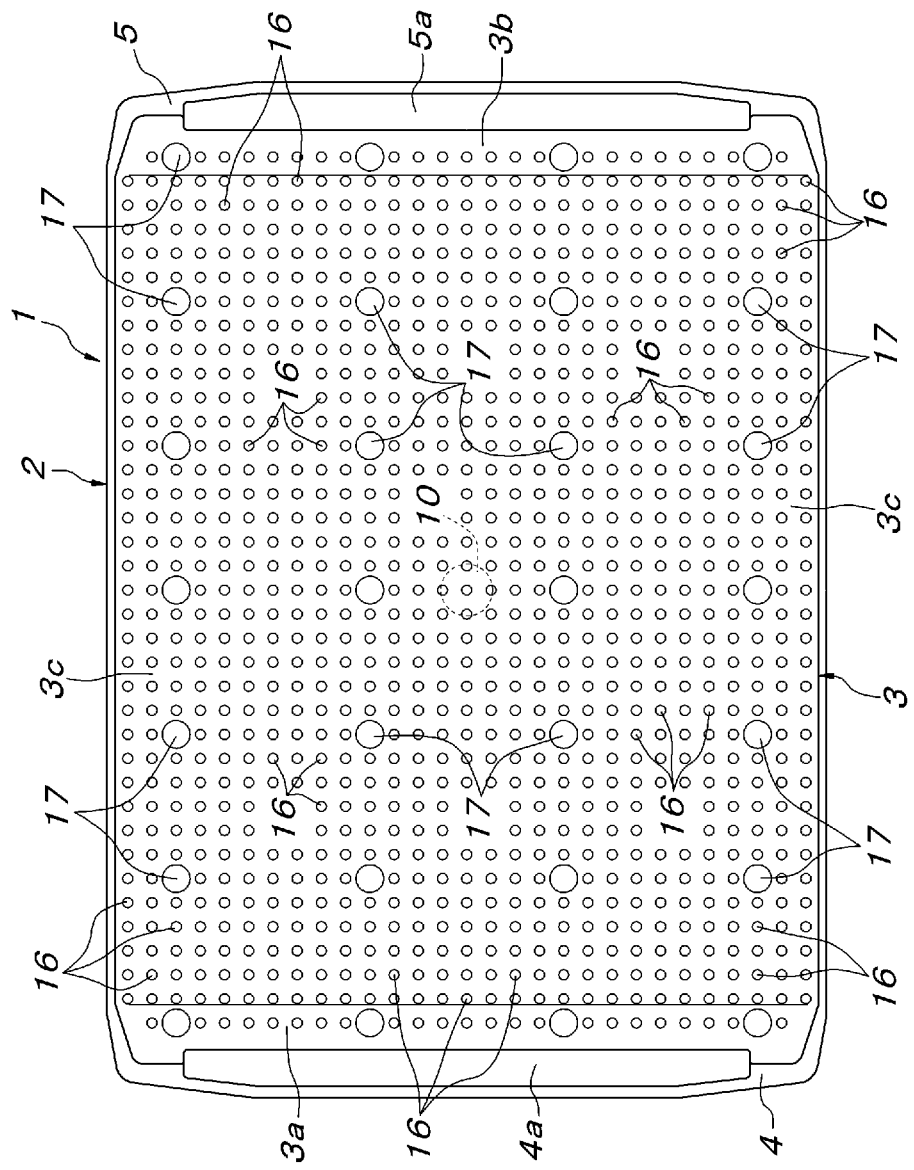

BAGGAGE CONVEYANCE TRAY

FIELD OF THE INVENTION

The present invention relates to a baggage conveyance tray used in a sorting conveyor system for conveying baggage, for example, at airports.

BACKGROUND OF THE INVENTION

As described in U.S. Pat. No. 6,471,039 (Patent Literature 1), this kind of baggage conveyance tray is used for safely conveying and sorting a variety of baggage different in shape, size, weight, etc., on a sorting conveyor. This tray is provided with raised wall plate portions protruding along the right-left width direction at front and rear both end portions of the tray of a rectangular shape whose length in the front-rear direction, which is the conveyance direction, is longer than the width in the right-left direction. A baggage placement surface between the front and rear both raised wall plate portions is concave along the length direction such that a central portion in the right-left width direction is lowered and right and left both sides are raised. That is, in the sorting conveyor system for conveying baggage for example, at airports, the baggage on the tray needs to be slid and discharged onto a sorting chute juxtaposed on a lateral side portion of a conveyor line. Therefore, the tray cannot be configured to have four, i.e., front, rear, right and left sides protrudingly provided with the raised wall plate portions to enclose the baggage, and the right and left both sides of the tray are opened. As a result, there is a possibility that the baggage being conveyed to the right-left laterally slides and falls off from the tray or comes in sliding contact with guards juxtaposed on right and left both sides of the conveyor line at a horizontal curve path, etc. To avoid such a situation, the baggage placement surface between the front and rear both raised wall plate portions of the tray is concave along the length direction such that the central portion in the right-left width direction is lowered and the right and left both sides are raised.

SUMMARY OF THE INVENTION

However, the baggage conveyance tray described in Patent Literature 1 has a structure that two pieces of flat plates are connected in an obtuse V shape along the length direction in order for the baggage placement surface between the front and rear both raised wall plate portions to have the central portion in the right-left width direction being lowered and the right and left both sides being raised. The surface with which the baggage comes in contact is flat. Thus, the effect of suppressing the placed baggage from sliding back and forth in the conveyance direction can be hardly expected. Accordingly, it is conceivable when attempting to increase the conveyance speed of the conveyor to improve the conveyance efficiency that the baggage may widely slide back and forth in the conveyance direction due to inertia at the time of acceleration and deceleration and run into, and in some cases jump over, the front and rear raised wall plate portions. Therefore, the conveyance speed of the conveyor needs to be kept reduced such that the baggage or tray can be conveyed safely while prevented from being damaged.

Accordingly, the present invention proposes a baggage conveyance tray capable of solving the foregoing conventional problems. Described by giving reference symbols in parentheses used in the description of embodiments described later in order to facilitate understanding the relationship with the embodiments, a baggage conveyance tray according to the present invention is a baggage conveyance tray (1) including raised wall plate portions (6, 7) protruding along a right-left width direction at front and rear both end portions in a length direction, which is a conveyance direction, and a baggage placement surface (8) between the front and rear both raised wall plate portions (6, 7), the baggage placement surface (8) being concave along the length direction such that a central portion in the right-left width direction is lowered and right and left both sides are raised, wherein elongated protrusion portions (13) along the right-left width direction of the tray (1) are provided on the baggage placement surface (8) so as to protrude at appropriate intervals in the length direction of the tray (1).

According to the above configuration of the present invention, the presence of the elongated protrusion portions along the right-left width direction of the tray on the baggage placement surface can provide baggage which is flexible enough to get into a gap between the elongated protrusion portions even if only slightly with a large resistance to sliding of the baggage in the front-rear direction of the tray. Also, as for baggage without such flexibility, bottom surface corner portions of the front end in the sliding direction of the baggage may be caught by the elongated protrusion portions at the time of sliding in the front-rear direction of the tray. In this case, the resistance the baggage undergoes becomes large as compared to the case of sliding on a flat baggage placement surface without the elongated protrusion portions. In this way, the sliding in the front-rear direction of the tray can be suppressed for most baggage. Therefore, even if the conveyance speed of the conveyor is increased to improve the conveyance efficiency, the situation can be avoided in which the baggage widely slides back and forth in the conveyance direction due to inertia at the time of acceleration and deceleration, runs into, and in some cases jumps over, the front and rear raised wall plate portions. In other words, the conveyance speed of the conveyor can be increased to improve the conveyance efficiency without the possibility of damaging the baggage and the tray. Furthermore, a measure to increase the coefficient of friction of the flat baggage placement surface against the baggage is not simply taken, but the elongated protrusion portions along the right-left width direction of the tray are protruded at appropriate intervals in the length direction of the tray as explained above. When the tray is tilted toward the sorting chute side to right-left laterally slide the baggage on the baggage placement surface by gravity and send the baggage toward the sorting chute side, the baggage slides in the length direction of the elongated protrusion portions, so that a slide contact area with the baggage placement surface is reduced and the baggage can be sent out smoothly and stably with the resistance reduced. Therefore, the configuration of the present invention can be utilized effectively as a baggage conveyance tray used in the sorting conveyor system.

When the above present invention is carried out, specifically, the baggage placement surface (8) can have front and rear both ends formed with substantially triangular inclined regions (9a, 9b) in a plan view, the triangular inclined regions (9a, 9b) having the baggage placement surface (8) raised toward the raised wall plate portions (6, 7) within a range that does not exceed the height of the right and left both sides of the front and rear both ends. By this configuration, even baggage with a rigid bottom surface like a trunk for example can be automatically damped as the baggage having slid in the front-rear direction with respect to the tray comes closer to the front or rear raised wall plate portion and be prevented from violently running into the front or rear raised wall plate portion, so that safety can be further improved.

The elongated protrusion portions (13) on the baggage placement surface can have a flat top surface (13a) parallel to the front-rear length direction of the tray (1) in a longitudinal sectional shape along the front-rear length direction of the tray (1), and the flat top surface (13a) can be formed with a rough surface portion (15) thereon. This rough surface portion can be formed on the entire flat top surface of the elongated protrusion portion, and can also be configured by arranging a number of rough surface regions, for example, in the form of a circle smaller than the width of the flat top surface of the elongated protrusion portion. This rough surface portion may be formed on the entire baggage placement surface not only on the flat top surface of the elongated protrusion portion. Further, a rough surface portion (16) can also be formed on a flat bottom surface of the tray (1). By forming the rough surface portion on the flat top surface of the elongated protrusion portion, the effect of suppressing the sliding of the baggage on the baggage placement surface can be further improved. When the rough surface portion is formed on the bottom surface of the tray, the friction resistance between the tray and the conveyor surface can be increased. Therefore, the conveyance speed of the conveyor can be increased to improve the conveyance efficiency. In particular, it becomes possible at a meeting point between conveyor lines to propel the tray along a meeting direction at a relatively high speed only by an auxiliary conveyor for supporting the bottom surface of the tray and propelling the tray along the meeting direction without using together a guide for forcibly changing the moving direction of the tray. Further, the rough surface portion (15, 16) can be composed of an annular protruding portion (15a) and a linear protruding portion (15b) formed on an inner surface encircled by the annular protruding portion (15a). The linear protruding portion (15b) is parallel to the right-left width direction of the tray and can be formed in parallel in large numbers at appropriate intervals in the front-rear length direction of the tray. According to this configuration, the wear resistance of the rough surface portion itself and the suppression effect of the sliding of the baggage in the front-rear direction can be improved as compared to the case of forming the rough surface portion on which a large number of small protrusions are simply arranged.

This kind of tray is generally a synthetic resin molded article. Conventionally, the tray is made into a product by superposing and integrating two components having been obtained by dividing the tray into a lower part and an upper part and molding them with synthetic resin, thereby forming a hollow tray, or vacuum-forming a hollow tray from the beginning. The tray is preferably one solidly and integrally molded by a molding method in which expanded polypropylene beads are heated and expanded within a mold. According to this molding method, the tray relatively lightweight yet excellent in mechanical strength, shock resistance, wear resistance, etc., can be produced by taking advantage of physical properties of expanded polypropylene. However, in this molding method, marks from steam vents provided to the mold as passages for supplying steam for heating the expanded beads into the mold (as a matter of course, the steam vents can be used for discharge of steam or air from within the mold) are left on the surface of the molded article. By taking the size and arrangement of the steam vents of the mold and the structure of opening portions into account such that the marks from the steam vents are slightly protruded from the tray surface and form the rough surface portions, the rough surface portions necessary for the flat top surface of the elongated protrusion portion and the bottom surface of the tray can be formed easily. In other words, the rough surface portions in the present invention can be formed by using the steam vents of the mold necessary for the molding of the tray. Extra costs for forming the rough surface portions can be eliminated, allowing for inexpensive implementation.

The front and rear both raised wall plate portions (6, 7) can be protruded at positions entered inside from the front and rear both ends in the length direction of the tray (1) and so as to be away inside from the right and left both sides of the tray (1). Bottom surface side corner portions of the front and rear both ends in the length direction of the tray (1) can be formed with recessed step portions (4, 5). The recessed step portions (4, 5) can be formed with positioning recessed portions (4a, 5a) to which at least upper end portions of the front and rear both raised wall plate portions (6, 7) of a lower tray (1) are fitted at the time of stacking the tray (1). According to this configuration, not only is the relative movement in both the front-rear and right-left directions between vertically adjacent trays completely prevented and the trays can be stacked stably by fitting the positioning recessed portions of the upper tray over the upper end portions of the front and rear both raised wall plate portions of the lower tray when empty trays are stacked, but also the recessed step portions of the bottom surface side corner portions of the front and rear both ends in the length direction of the tray serve as gripping portions for fingers to be inserted and for supporting the tray when the tray is lifted up by both hands, and the tray can be carried safely and easily.

Further, an information chip capable of contactless detection such as an RFID generally referred to as an IC tag needs to be embedded in this kind of baggage conveyance tray in order to add identification information specific to each tray necessary for automating the sorting operation in the sorting conveyor system. In the case where this tray is solidly and integrally molded with synthetic resin, the baggage placement surface (8) can be formed with a depressed portion (10) and a cap (12) can be fitted and fixed to the depressed portion (10) in a state where the information chip (11) capable of contactless detection is accommodated within the depressed portion (10). According to this configuration, the depressed portion is configured to have a depth reaching close to the bottom surface of the tray, whereby the information chip can be detected easily and reliably from a single point immediately below the conveyance path of the tray regardless of the orientation of the tray. Embedding the information chip in the position as above is easy as compared to the tray of the hollow structure, and furthermore, the information chip can be fully protected.

BRIEF DESCRIPTION OF THE DRAWINGS

FIG. 1 is a plan view of a tray.

FIG. 8 is a bottom view showing a modification of the tray.

DETAILED DESCRIPTION OF THE INVENTION

Figure 2A:
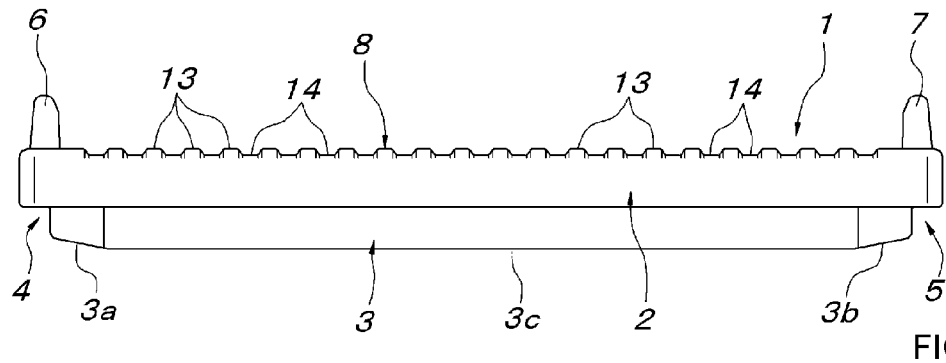
FIG. 2A is a side view of the tray and FIG. 2B is a sectional view taken along the line A-A of FIG. 1.
Figure 2B:
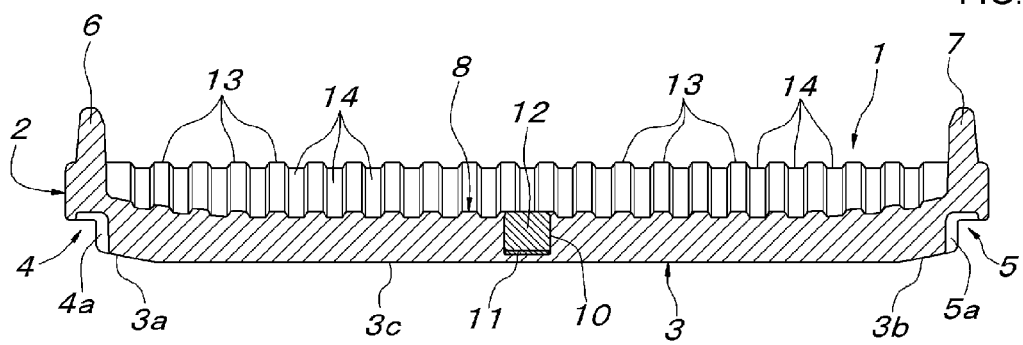
Figure 3A:
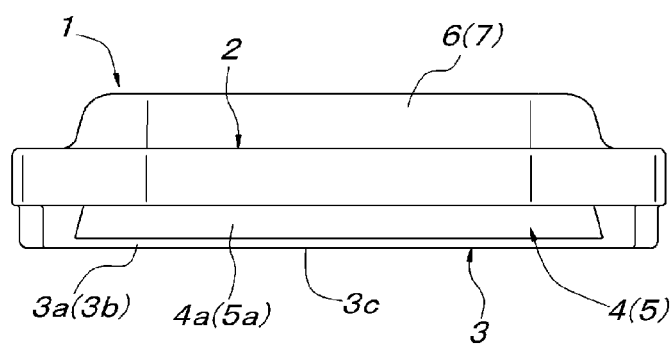
FIG. 3A is a front view of the tray and FIG. 3B is a sectional view taken along the line B-B of FIG. 1.
Figure 3B:
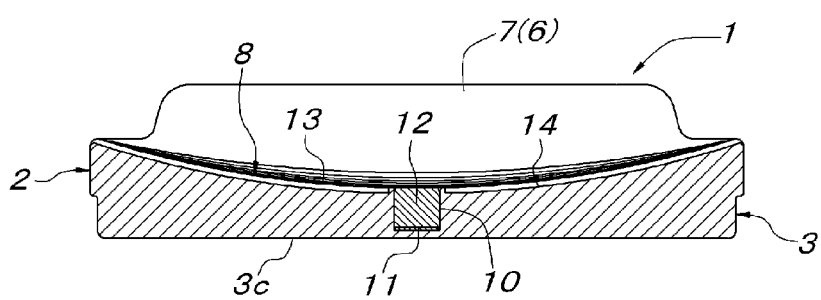

A tray 1 according to one embodiment of the present invention shown in FIGS. 1 to 3B has a solid structure integrally molded with expanded polypropylene (EPP), and a planar shape thereof is a rectangular shape (a rectangle) in which the front-rear length direction, which is the conveyance direction, is longer than the width in the right-left direction. Four corners in the planar shape are obliquely cut off and formed to have an obtuse angle. As shown in FIGS. 2A-2B and FIGS. 3A-3B, this tray 1 includes an upper tray main body 2 and a lower base portion 3 with the entire periphery one size smaller than the tray main body 2. Thus, both end portions in the front-rear length direction of the upper tray main body 2 are projected with respect to both end portions in the front-rear length direction of the lower base portion 3. Lower sides of the both end portions in the front-rear length direction of the upper tray main body 2 constitute recessed step portions 4, 5. The lower base portion 3 has inclined bottom surface portions 3a, 3b inclined obliquely upward, at the both end portions in the front-rear length direction thereof in a side view (FIGS. 2A and 2B).

Figure 4A:
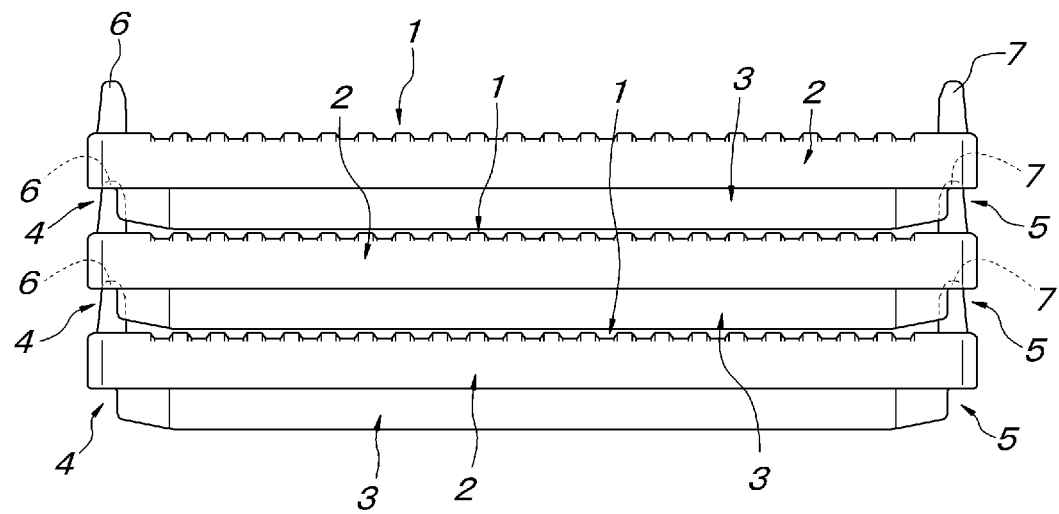
FIG. 4A is a side view showing a state of trays being stacked and FIG. 4B is a front view thereof.
Figure 4B:
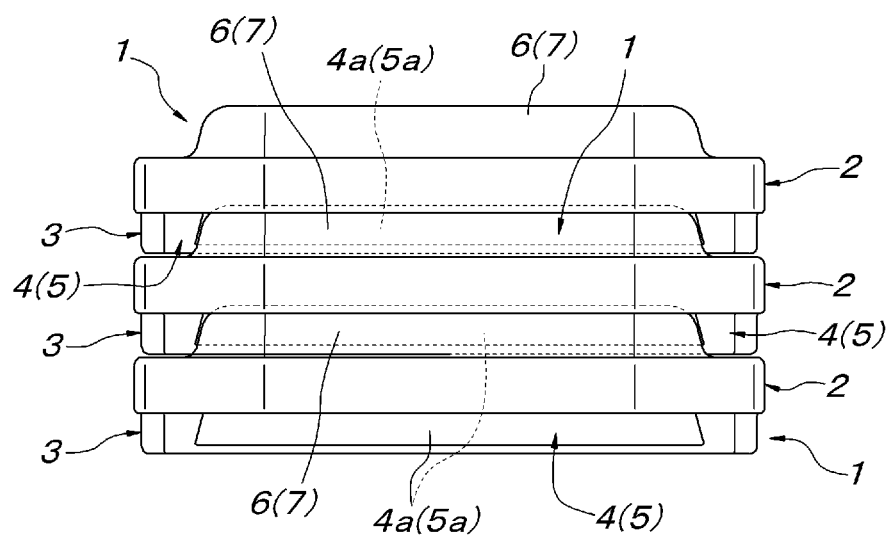

Raised wall plate portions 6, 7 protruding along the right-left width direction at positions slightly entered inside from both ends in the front-rear length direction of the tray main body 2 are provided by integral molding on the both end portions in the front-rear length direction of the upper tray main body 2. The front and rear both raised wall plate portions 6, 7 have the length in the left-right width direction shorter than the left-right width of the tray main body 2 and have right and left both ends symmetrically entered inside from the tray main body 2. On the other hand, on the recessed step portions 4, 5 of the bottom portions of the front and rear both ends, L-shaped recessed portions 4a, 5a opened only downward are formed from a ceiling surface to a vertical surface of the recessed step portions 4, 5. When the same trays 1 are stacked in the same orientation and the front and rear both raised wall plate portions 6, 7 of the lower tray 1 are fitted into the front and rear both recessed step portions 4, 5 of the upper tray 1 as shown in FIGS. 4A and 4B, upper end portions of the raised wall plate portions 6, 7 are fitted to the ceiling side of the L-shaped recessed portions 4a, 5a and the both end portions in the front-rear length direction of the upper tray 1 are supported by the front and rear both raised wall plate portions 6, 7 of the lower tray 1. Also, the relative movement in the right-left width direction between the upper and lower both trays 1 is inhibited by the fitting of inner external corner portions of the raised wall plate portions 6, 7 with respect to the L-shaped recessed portions 4a, 5a. Thus, the upper tray 1 can be positioned in place in the right-left width direction with respect to the lower tray 1.

Figure 5A:
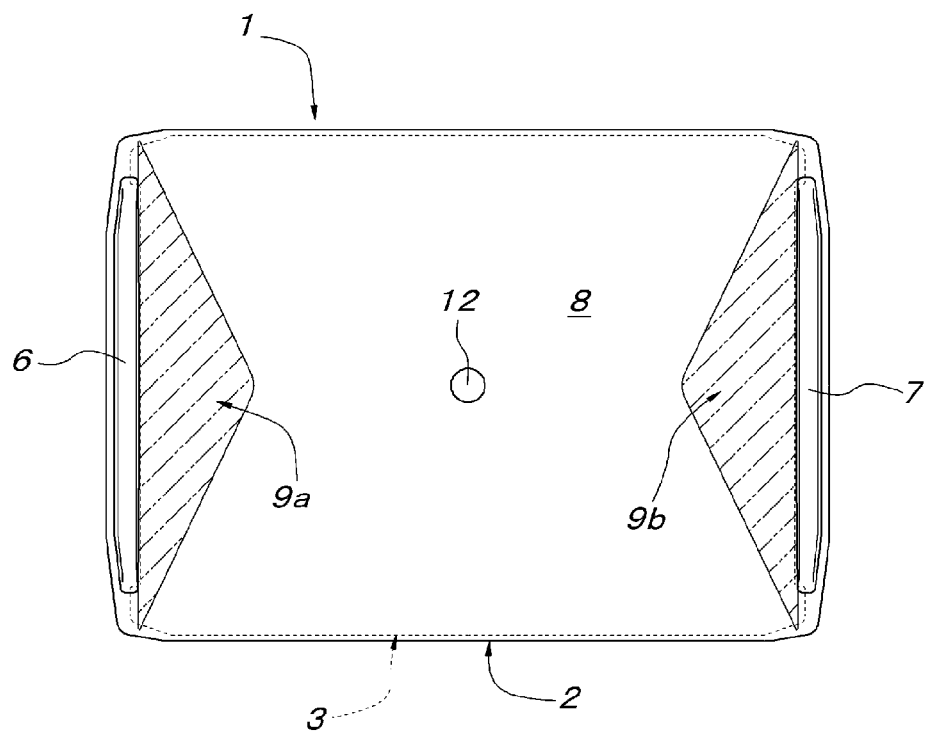
FIG. 5A is a plan view showing inclined regions at both end portions in the length direction of a baggage placement surface with elongated protrusion portion on the baggage placement surface omitted.
Figure 5B:
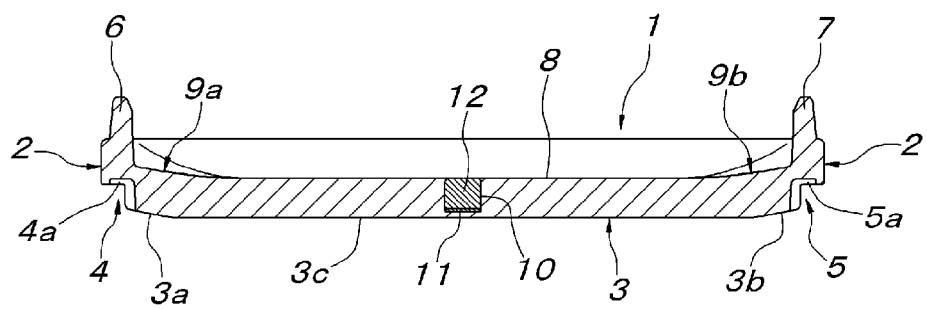
FIG. 5B is a central longitudinal sectional side view thereof.
Figure 5C:
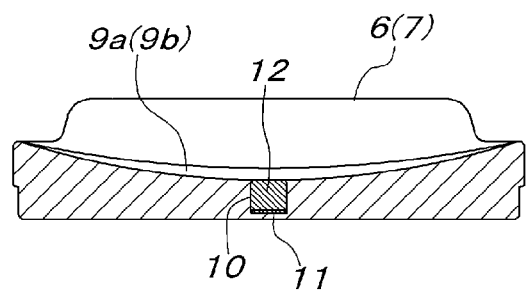
FIG. 5C is a central longitudinal sectional front view thereof.

The tray 1 configured as above has a top surface between the front and rear both raised wall plate portions 6, 7 serving as a baggage placement surface 8. As shown in FIGS. 5A, 5B and 5C, this baggage placement surface 8 is concave in an arc shape along the front-rear length direction in its entirety so as to have a central portion in the right-left width direction being the lowest and be raised toward the right and left both sides from the central portion. Also, the baggage placement surface 8 has both ends in the front-rear length direction thereof formed with substantially triangular inclined regions 9a, 9b in a plan view raised toward the front and rear both raised wall plate portions 6, 7 within the range which does not exceed the height of the right and left both sides of the both ends.

Further, the central portion of the tray 1 is formed with a cylindrical depressed portion 10 opened in the baggage placement surface 8 and having such a depth that a bottom surface reaches close to the bottom surface of the tray 1. A cap 12 is fitted and fixed to the depressed portion 10 in a state where a thin plate-shaped information chip 11 such as an RFID capable of contactless detection is accommodated within the depressed portion 10. This cap 12 can also be produced by solid molding of synthetic resin, but may be molded with the same material as that of the tray 1 or with a different material therefrom. The cylindrical depressed portion 10 has an opening circumferential portion formed slightly smaller in diameter, and the cap 12 is molded in a shape and size that can just fill an internal space of the depressed portion 10 (including the smaller diameter opening portion) extending from above the information chip 11 to the top surface (the baggage placement surface 8) of the tray 1, whereby the cap 12 is configured to be fixable within the depressed portion 10 by press fitting. However, the cap 12 can be completely fixed with a combination of adhesive as needed.

The above baggage placement surface 8 of the tray 1 having the inclined regions 9a, 9b and being concave in an arc shape is provided with elongated protrusion portions 13 protruding along the right-left width direction of the tray 1 at appropriate intervals in the length direction of the tray. More specifically, each elongated protrusion portion 13 has a flat trapezoidal shape with a flat top surface 13a parallel to the front-rear length direction of the tray 1 in a longitudinal sectional shape along the front-rear length direction of the tray. A valley portion 14 between adjacent elongated protrusion portions 13 is formed in an inverted trapezoidal shape having a shape and size of the elongated protrusion portion 13 turned upside down. It is noted that FIGS. 5A, 5B and 5C is illustrated for the purpose of explanation of the inclined regions 9a, 9b and the elongated protrusion portions 13 are not annexed after the tray 1 in the state shown in FIGS. 5A, 5B and 5C is produced but the entire tray 1 including these elongated protrusion portions 13 has a solid structure integrally molded with expanded polypropylene (EPP).

Figure 6:
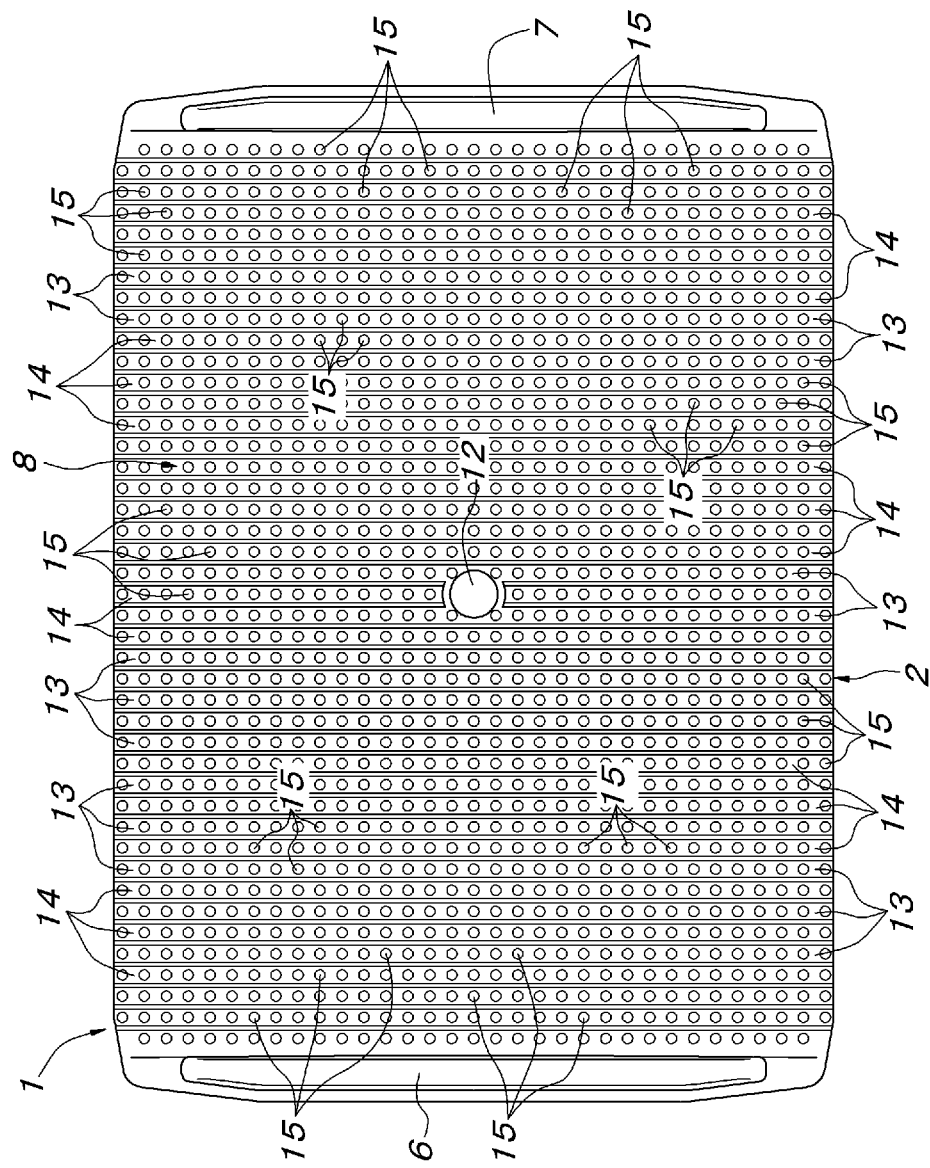
FIG. 6 is a plan view showing a modification of the tray.

Next, a modification of the embodiment of the present invention will be described based on FIGS. 6 to 8. On the surface of each elongated protrusion portion 13 and valley portion 14 between respective elongated protrusion portions 13 integrally molded to the baggage placement surface 8 of the tray 1, rough surface portions 15 smaller than the width of the elongated protrusion portion 13 and valley portion 14 are formed at appropriate intervals in the length direction of the elongated protrusion portion 13 and valley portion 14. Further, as shown in FIG. 8, the same rough surface portions 16 as the rough surface portions 15 are uniformly distributed and formed also on the flat bottom surface of the tray 1, that is, the entire flat bottom surface 3c of the lower base portion 3 of the tray 1. Ejector pin marks 17 due to a number of molded article ejector pins embedded in the lower mold of the mold for molding the bottom surface side of the tray 1 are formed on the bottom surface of the tray 1.

Figure 7A:
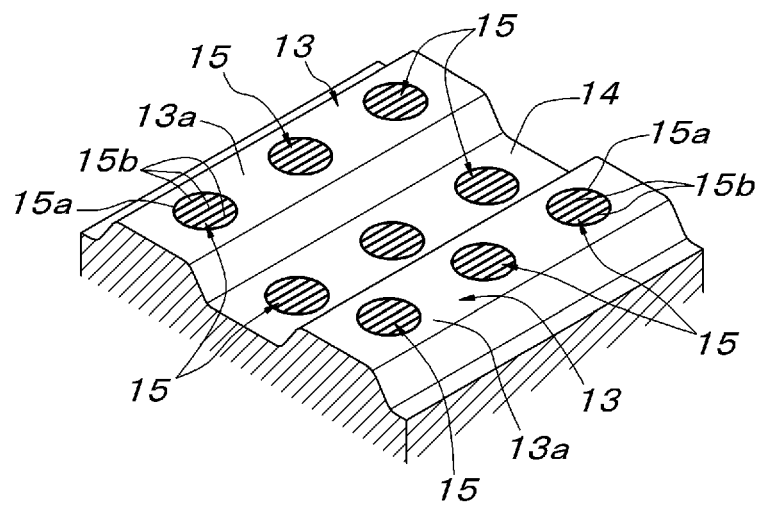
FIG. 7A is an enlarged perspective view of a part of FIG. 6
Figure 7B:
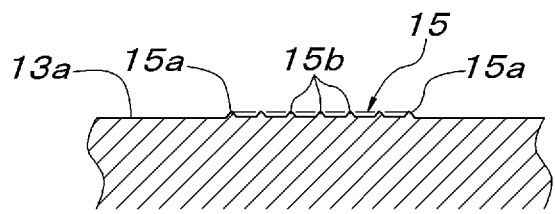
FIG. 7B is an enlarged longitudinal sectional view of a main part of FIG. 7A.

As explained above, this tray 1 is solidly and integrally molded by the molding method in which expanded polypropylene (EPP) beads are heated and expanded within the mold. The upper and lower molds of the mold are provided with steam vents for use in supply of steam into the mold and/or discharge of steam and air from within the mold. As a matter of course, a vertical grid is disposed over the steam vent, substantially flush with the inner surface of the mold to prevent the EPP beams from entering the steam vent. Therefore, steam vent marks in the vertical grid pattern are resultingly formed on a surface which comes in contact with the mold of molded articles. The size and arrangement of the steam vents of the mold and the structure of opening portions are designed such that the grid-pattern steam vent marks are slightly projected from the surfaces of the elongated protrusion portions 13 and valley portions 14 or the bottom surface of the tray, thereby forming the rough surface portions 15 on the surfaces of the elongated protrusion portions 13 and valley portions 14 and/or the rough surface portions 16 on the bottom surface of the tray, as shown in FIG. 7B. Similarly, the ejector pin marks 17 formed on the bottom surface of the tray 1 can also be slightly projected from the bottom surface of the tray 1 by considering a home position of a distal end surface of the ejector pin with respect to the lower mold. As a matter of course, it is also possible to provide steam vents opened in the distal end surface of the ejector pins and form the rough surface portions slightly projected from the bottom surface of the tray, within the ejector pin marks 17 formed on the bottom surface of the tray, if technically possible.

In either case, the rough surface portions 15, 16 need to be slightly projected from the surfaces of the elongated protrusion portions 13 and valley portions 14 or the bottom surface of the tray to increase the coefficient of friction of the surfaces of the elongated protrusion portions 13 and valley portions 14 or the bottom surface of the tray. It is preferable that particularly the rough surface portions 15 formed on the surfaces of the elongated protrusion portions 13 and valley portions 14 increase the friction resistance when the baggage slides in the front-rear length direction of the tray 1, but have less influence on the friction resistance when the baggage slides in the direction along the elongated protrusion portions 13. Thus, as shown in FIG. 7A, the rough surface portion 15 is preferably such that a plurality of linear protruding portions 15b parallel to the length direction of the elongated protrusion portions 13 are arranged in parallel inside an annular protruding portion 15a at appropriate intervals in the front-rear length direction of the tray 1 or such that only a plurality of linear protruding portions 15b are arranged in parallel without the annular protruding portion 15a. Further, the rough surface portions 16 on the bottom surface of the tray are supposed to increase the friction resistance between the rough surface portions 16 and the conveyor surface. Accordingly, in order to enable high-speed conveyance, the rough surface portion 16 is preferably such that a plurality of linear protruding portions 15b parallel to the right-left width direction of the tray 1 are arranged in parallel (regardless of the presence or absence of the annular protruding portion 15a) similar to the rough surface portions 15 formed on the surfaces of the elongated protrusion portions 13 and valley portions 14. However, basically, the rough surface portions 16 on the bottom surface of the tray are not essential in the present invention, and may be not necessary. If provided, the rough surface portions 16 may be of any structure.

The baggage conveyance tray 1 configured as above can be used in the sorting conveyor system, for example, at airports, in exactly the same manner as in the conventional baggage conveyance tray as described in Patent Literature 1. At that time, the elongated protrusion portions 13 provided on the baggage placement surface 8 of the tray 1 and the rough surface portions 15 formed at least on the surfaces of the elongated protrusion portions 13 will exhibit the advantageous effect as explained above.

The above configured tray 1 is merely a preferred embodiment of the present invention and can be modified and implemented freely within the technical scope of the present invention. For example, the rough surface portions 15 formed on the valley portions 14 having less opportunity to contact with the baggage surface may be omitted. The rough surface portions 15, 16 may be ones formed by post-processing after the molding, without being limited to ones that utilize the steam vent marks from the mold. As a matter of course, the rough surface portions 15, 16 may be in the form like a gravel surface, without being limited to ones having a plurality of linear protruding portions arranged in parallel. Furthermore, the rough surface portions 15 provided on the elongated protrusion portions 13 can be formed in a strip shape continuing in the length direction of the elongated protrusion portions 13.

The baggage conveyance tray of the present invention can be utilized as a baggage conveyance tray capable of increasing the conveyance speed in the sorting conveyor system for conveying baggage, for example, at airports.

What is claimed is:

1. A baggage conveyance tray comprising:
    front and rear raised wall plate portions protruding along a right-left width direction at front and rear end portions in a length direction, which is a conveyance direction;
    a baggage placement surface between the front and rear raised wall plate portions, wherein elongated protrusion portions along the right-left width direction of the tray are provided on the baggage placement surface so as to protrude at intervals in the length direction of the tray;
    the elongated protrusion portions on the baggage placement surface having a flat top surface parallel to a front-rear length direction of the tray, and the flat top surface is formed with a protruding surface portion thereon; and
    the protruding surface portion is encircled by an annular protruding portion, and linear protruding portions in the right-left width direction of the tray are formed in parallel inside the annular protruding portion.

2. The baggage conveyance tray according to claim 1, wherein the baggage placement surface has front and rear ends formed with substantially triangular inclined regions in a plan view, the triangular inclined regions having the baggage placement surface raised toward the raised wall plate portions within a range that does not exceed the height of the right and left sides of the front and rear ends.

3. The baggage conveyance tray according to claim 1, wherein the tray has a flat bottom surface, and this flat bottom surface is formed with a protruding surface portion thereon.

4. The baggage conveyance tray according to claim 1, wherein the tray is solidly and integrally molded by a molding method in which expanded polypropylene beads are heated and expanded within a mold, and the protruding surface portion is formed by a steam vent mark of the mold used at the time of molding the tray.

5. The baggage conveyance tray according to claim 1, wherein the front and rear raised wall plate portions are protruded at positions entered inside from the front and rear ends in the length direction of the tray and so as to be away inside from the right and left sides of the tray, and bottom surface side corner portions of the front and rear ends in the length direction of the tray are formed with recessed step portions, and the recessed step portions are formed with positioning recessed portions to which at least upper end portions of the front and rear raised wall plate portions of a lower tray are fitted at the time of stacking the tray.

6. The baggage conveyance tray according to claim 1, wherein the tray is solidly and integrally molded with synthetic resin, and the baggage placement surface is formed with a depressed portion, and a cap is fitted and fixed to the depressed portion in a state where an information chip capable of contactless detection is accommodated within the depressed portion.

7. The baggage conveyance trays according to claim 1, wherein the baggage placement surface is concave along the length direction such that a central portion in the right-left width direction is lowered and right and left both sides are raised.

* * * * *